United States Patent
Li

(10) Patent No.: US 10,382,719 B2
(45) Date of Patent: Aug. 13, 2019

(54) METHOD AND APPARATUS FOR SHARING INFORMATION DURING VIDEO CALL

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/958,093

(22) Filed: Apr. 20, 2018

(65) Prior Publication Data
US 2018/0376104 A1 Dec. 27, 2018

(30) Foreign Application Priority Data
Jun. 27, 2017 (CN) .......................... 2017 1 0500964

(51) Int. Cl.
*H04N 7/14* (2006.01)
*G06F 17/24* (2006.01)
*H04L 12/18* (2006.01)

(52) U.S. Cl.
CPC ........... *H04N 7/141* (2013.01); *G06F 17/241* (2013.01); *H04N 7/147* (2013.01); *H04L 12/1813* (2013.01)

(58) Field of Classification Search
CPC ....................................................... H04N 7/14
USPC .......................................... 348/14.01–14.09
See application file for complete search history.

(56) References Cited

U.S. PATENT DOCUMENTS

| 9,754,292 B1* | 9/2017 | Pattan ................ G06Q 30/0269 |
| 2012/0166546 A1* | 6/2012 | Venon .................... G16H 80/00 709/205 |
| 2015/0356063 A1 | 12/2015 | Jiang et al. |
| 2017/0039867 A1* | 2/2017 | Fieldman ............... G09B 5/065 |
| 2018/0276896 A1* | 9/2018 | Launonen ............. G06F 17/241 |

FOREIGN PATENT DOCUMENTS

| CN | 105072460 A | 11/2015 |
| CN | 105338479 A | 2/2016 |
| CN | 106789130 A | 5/2017 |
| CN | 106791937 A | 5/2017 |
| WO | 2016073185 A1 | 5/2016 |

OTHER PUBLICATIONS

First Office Action for Chinese Patent Application No. 201710500964.6 dated Mar. 13, 2019.

* cited by examiner

*Primary Examiner* — Maria El-Zoobi
(74) *Attorney, Agent, or Firm* — Calfee, Halter & Griswold LLP

(57) ABSTRACT

The present application provides a method and apparatus for sharing information during a video call. The method includes: receiving an annotation request from a terminal participating in the video call; determining a frame of image that corresponds to the annotation request in the video call as an image to be annotated; receiving from the terminal an annotation message that corresponds to the annotation request; generating an annotated image by annotating at a corresponding position in the image to be annotated based on the annotation message; and transmitting the annotated image. This allows generating the annotated image by a server.

17 Claims, 6 Drawing Sheets

METHOD AND APPARATUS FOR SHARING INFORMATION DURING VIDEO CALL

CROSS-REFERENCE TO THE RELATED APPLICATION

The present application claims priority to the Chinese patent application No. 201710526955.4 filed on Jun. 27, 2017, the entire disclosure of which is hereby incorporated by reference.

TECHNICAL FIELD

The present disclosure relates to the field of data processing, and particularly to a method and apparatus for sharing information during a video call.

BACKGROUND

As network technologies develop, users have more and more demands for video calls. In addition to application in entertainment, Video calls are extensively employed in practical work, e.g., application scenarios for remote guidance like remote maintenance, remote medical care, etc.

During a remote guidance utilizing a video call, in addition to communication via video or audio instant conversations, a user may perform annotation operations on a picture obtaining from the video call, which allows explaining problems more exactly and visually during the process of remote guidance.

However, existing annotating methods are mostly applied to scenarios involving one-to-one annotation guidance. Usually, a user annotates a picture on a terminal. Upon completion of annotating, a picture containing annotation is formed and sent out by the terminal. Such methods cannot be applied to a scenario in which multiple users annotate simultaneously, and therefore cannot meet the users' demands.

SUMMARY

In view of the above problems, embodiments of the present disclosure provide a method and apparatus for sharing information during a video call.

According to an aspect of embodiments of the present disclosure, there is provided a method for sharing information during a video call. The method comprises: receiving an annotation request from a terminal participating in the video call; determining a frame of image that corresponds to the annotation request in the video call as an image to be annotated; receiving from the terminal an annotation message that corresponds to the annotation request; generating an annotated image by annotating at a corresponding position in the image to be annotated based on the annotation message; and transmitting the annotated image.

In some embodiments, the annotation message comprises a screen resolution of screen of the terminal and first position information indicative of a position of the annotation on the screen of the terminal. The step of generating the annotated image comprises: calculating a conversion proportion based on the screen resolution and an image resolution of the image to be annotated; converting the first position information to second position information indicative of a position in the image to be annotated according to the conversion proportion; and annotating at the position indicated by the second position information in the image to be annotated to generate the annotated image.

In some embodiments, the step of receiving an annotation request from a terminal participating in the video call comprises: upon receipt of the annotation request, adding the annotation request into a preset annotation queue.

In some embodiments, when no annotated image is generated, real-time video frames in the video call are transmitted according to a first template. After the annotated image is generated, the step of transmitting the annotated image comprises: merging the annotated image with the real-time video frames into target images according to a second template, and transmitting the target images.

In some embodiments, the method further comprises: stopping generation of the annotated image when a preset stop condition is reached.

In some embodiments, the preset stop condition comprises at least one of the following: receiving an annotation-clearing instruction; and receiving no new annotation request within a preset time period after all of the annotation requests in the annotation queue are processed.

In some embodiments, the first template includes a real-time video area, and the second template comprises a real-time video area and an annotated image area.

According to another aspect of embodiments of the present disclosure, there is provided a method for sharing information during a video call. The method comprises: transmitting an annotation request to a server for serving the video call when a first operation performed by a user on an image to be annotated is detected on a terminal participating in the video call; extracting, from a sensed annotation made by the user in the image to be annotated, feature information of the annotation; generating an annotation message characterizing the annotation based on the feature information; and transmitting the annotation message to the server so that the server makes corresponding annotation on the image to be annotated.

In some embodiments, the feature information comprises first position information indicative of a position of the annotation on a screen of the terminal. The step of generating an annotation message characterizing the annotation comprises: obtaining a screen resolution of the screen of the terminal; and including the screen resolution and the first position information in the annotation message.

In some embodiments, the method further comprises: upon detection of change of video content of real-time video frames in the video call, generating an annotation-clearing instruction; and transmitting the annotation-clearing instruction to the server to notify the server to stop annotation.

In some embodiments, the method further comprises: upon detecting that the user issues an annotation-clearing command, generating an annotation-clearing instruction; and transmitting the annotation-clearing instruction to the server to notify the server to stop annotation.

According to a further aspect of embodiments of the present disclosure, there is provided an apparatus for sharing information during a video call. The apparatus comprises a receiver, an image determiner, an image generator and a transmitter. The receiver is configured to receive an annotation request from a terminal participating in the video call, and receive an annotation message that corresponds to the annotation request. The image determiner is configured to determine a frame of image that corresponds to the annotation request in the video call as an image to be annotated. The image generator is configured to generate an annotated image by annotating at a corresponding position in the image to be annotated based on the annotation message. The transmitter is configured to transmit the annotated image.

In some embodiments, the image generator further comprises an analyzer, a calculator, a converter and an annotator. The analyzer is configured to analyze the annotation message to obtain a screen resolution of screen of the terminal and first position information indicative of a position of the annotation on the screen of the terminal. The calculator is configured to calculate a conversion proportion based on the screen resolution and an image resolution of the image to be annotated. The converter is configured to convert the first position information to second position information indicative of a position in the image to be annotated according to the conversion proportion. The annotator is configured to make annotation at the position indicated by the second position information in the image to be annotated to generate an annotated image.

In some embodiments, the apparatus further comprises an annotation queue. The receiver is arranged to, upon receipt of multiple annotation requests for the image to be annotated, add the multiple annotation requests into the annotation queue in order to process them in a sequential way.

In some embodiments, the image generator is arranged to stop generation of the annotated image when a preset stop condition is reached.

According to a further aspect of embodiments of the present disclosure, there is provided an apparatus for sharing information during a video call. The apparatus comprises a transmitter, a feature extractor and a message generator. The transmitter is configured to transmit an annotation request to a server for serving the video call when a first operation performed by a user on an image to be annotated is detected during the video call. The feature extractor is configured to extract, from a sensed annotation made by the user in the image to be annotated, feature information of the annotation. The message generator is configured to generate an annotation message characterizing the annotation based on the feature information. The transmitter is further configured to transmit the annotation message to the server so that the server makes corresponding annotation in the image to be annotated.

According to a further aspect of embodiments of the present disclosure, there is provided a computer-readable storage device having computer program instructions embodied thereon. The computer program instructions are used to program a processor to execute the abovementioned method.

According to a further aspect of embodiments of the present disclosure, there is provided a computing device comprising a processor and a memory with computer program instructions stored thereon. The computer program instructions, when executed by the processor, perform the abovementioned method.

BRIEF DESCRIPTION OF DRAWINGS

These and other aspects of the present disclosure will be described in more detail by reference to the following drawings in conjunction with the accompanying specification, in which.

DETAILED DESCRIPTION

The present disclosure will be described in more detail with reference to the drawings. In the following depiction, for purposes of explanation, numerous specific details are set forth in order to provide an understanding of the claimed subject matter. It may be evident, however, that the claimed subject matter may be practiced without these specific details.

Figure 1:
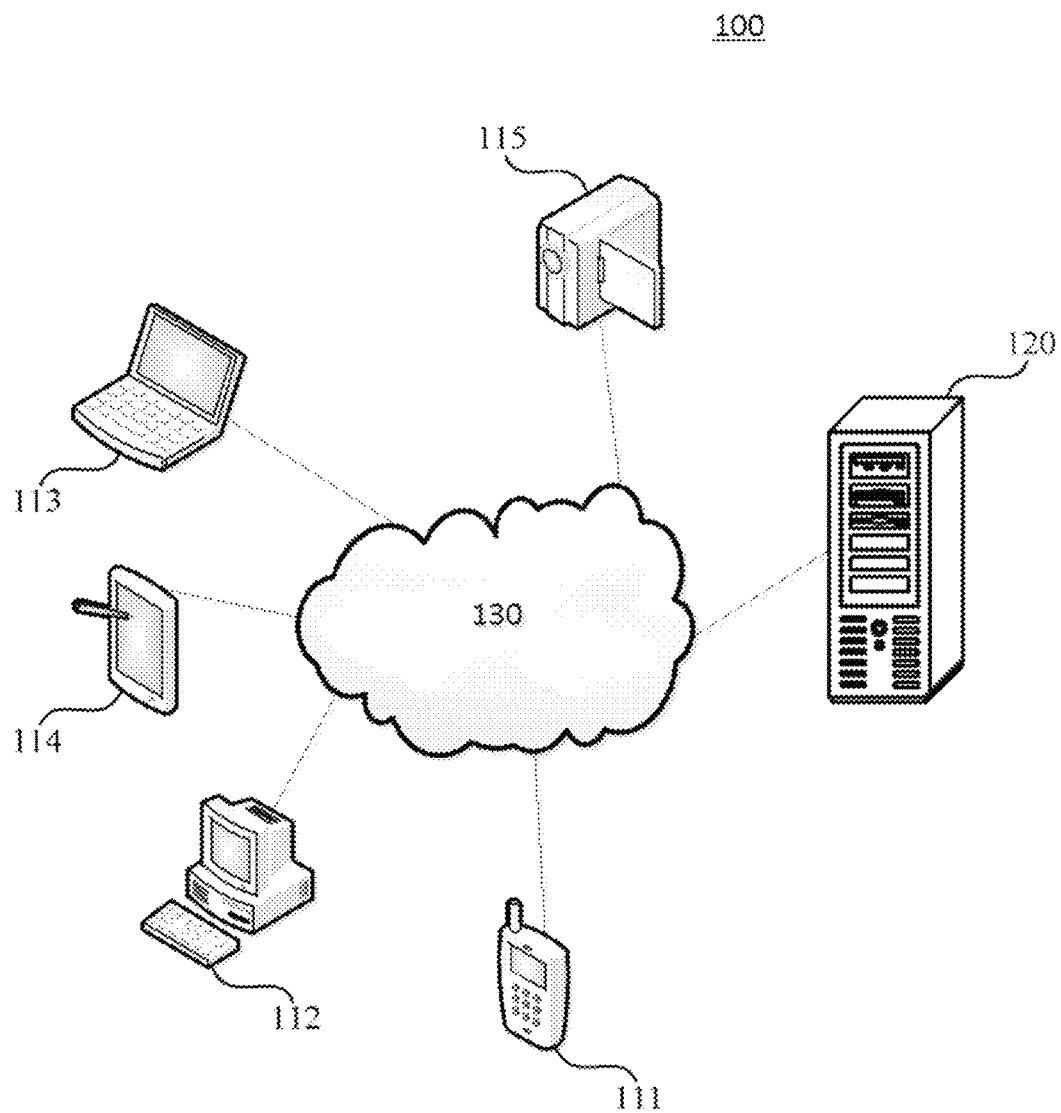
FIG. 1 is a schematic diagram of an environment in which embodiments of the present disclosure may be applied.

FIG. 1 schematically illustrates an environment 100 in which embodiments of the present disclosure may be applied. As shown in FIG. 1, the environment 100 comprises a plurality of terminals, each of which may be configured to transmit or receive real-time video frames. The terminals may be mobile devices (e.g., smartphones), computers (e.g., desktop, laptop or tablet computers), video capturing devices (such as cameras) and the like.

The environment 100 further comprises a server 120 which may communicate with respective terminals via a network 130 to receive/transmit real-time video frames from/to the terminals. The video frames may be in a form of video stream. In some embodiments, the server 120 may store the received video frames, process them, and transmit the processed video frames. The terminals may establish video calls and share information between/among them through the server 120.

As used herein, the term "video call" is intended to refer to different types of video communication between two terminals or among more than two terminals, including but not limiting to "video phone", "videoconferencing", "telemedicine", or any other remote applications employing video communication technology.

It would be appreciated that the terminals and the server may be implemented by computing devices that are configured in various manners. The computing devices may range from full-resource devices with substantial memories and processor resources to low-resource devices with limited memories and/or processing resources. The computing devices also include software that causes the computing devices to perform one or more operations described below.

FIG. 1 shows a plurality of different types of terminals, including a smart phone 111, a desktop computer 112, a laptop computer 113, a tablet computer 114 and a video camera 115. In an exemplary scenario, the video camera 115 may be a terminal for capturing/transmitting real-time video frames, whereas the smart phone 111, the desktop computer 112, the laptop computer 113 and the tablet computer 114 may be terminals for receiving the video frames. The video camera 115 may establish a corresponding network connection with the server 130 to transmit the captured video frames to the server in order to share them with other terminals.

Correspondingly, other terminals in the environment such as the smart phone 111, the desktop computer 112, the laptop computer 113 and the tablet computer 114 may receive the video frames captured by the video camera 115 through the server, thereby sharing the information acquired by the video camera 115.

It would be appreciated that in some other scenarios, other terminals than the video camera in the environment may also transmit video frames without departing from the scope of the present disclosure.

The plurality of terminals may establish video calls via the server to share information therebetween. The video calls may be used for many purposes such as remote education, remote medical care or remote maintenance. The video frames in the video calls may represent any of suitable types of video, including but not limited to live video of the site where users of the video call are located, pre-stored video, etc. In some embodiments, the video frames for example reflect a fault scene in a maintenance scenario, a diagnosis scene in a medical care scenario or a classroom scene in an education scenario, and/or materials, pictures, or the like pertaining to relevant scenarios. For example, in the case of remote maintenance, the video frames may be live images of a fault area captured by the video camera 115, pre-stored relevant materials, pictures of the fault area, or the like.

During the video call, users of the terminals might desire to discuss some of information shared. Therefore, the users may make annotation in transmitted and/or received video frames to convey specific information or facilitate to explain their own opinions.

Figure 2:
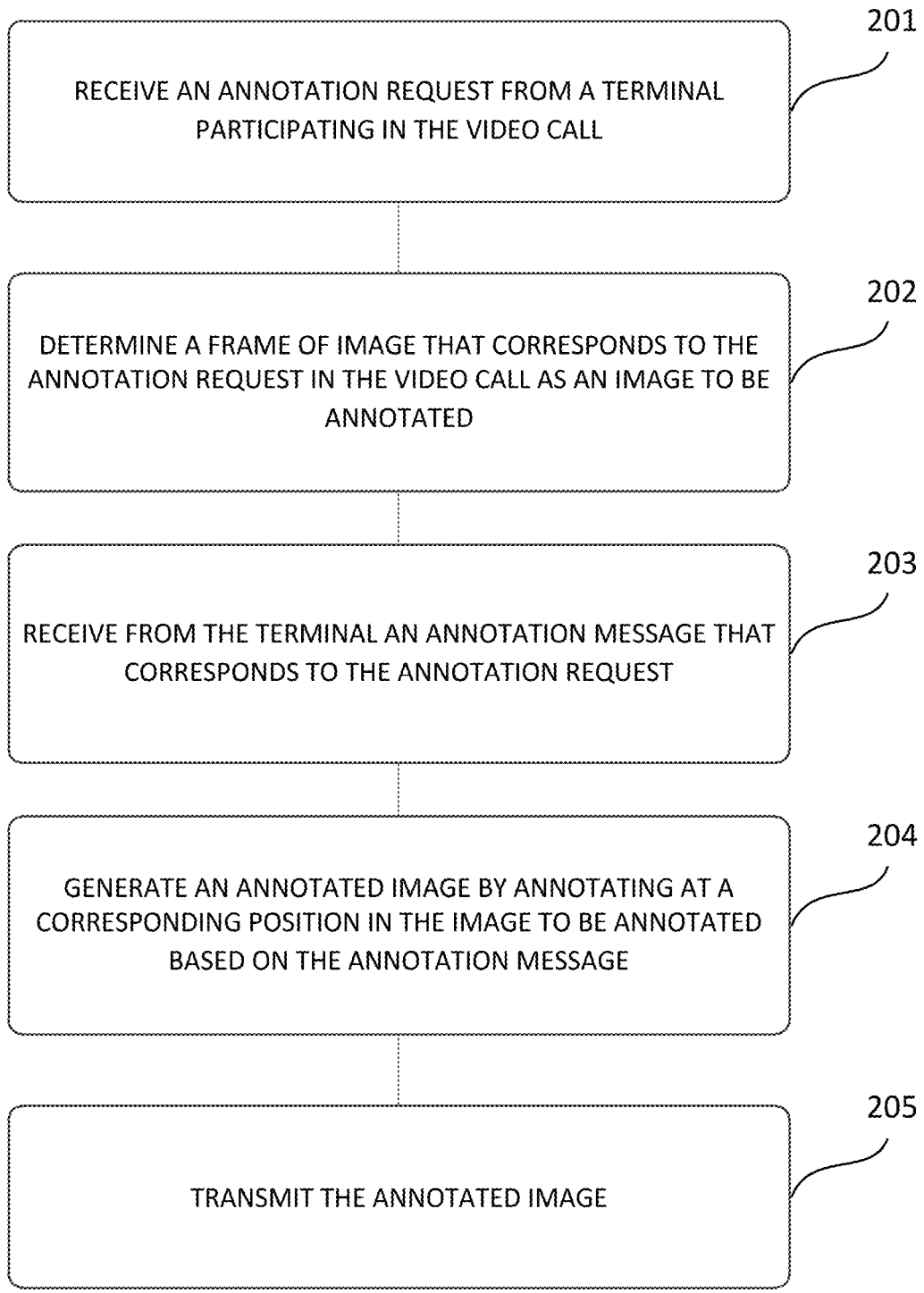
FIG. 2 is a flow chart of an exemplary method according to an embodiment of the present disclosure.

FIG. 2 illustrates an exemplary method for sharing information during a video call according to an embodiment of the present disclosure.

In this method, multiple terminals may establish a video call among them via the server. The server may receive requests from the terminals and correspondingly process video frames received and transmitted during the video call.

After the video call is established, a video-transmitting terminal(s) may upstream video frames to the server using an upstreaming address, and then the server may forward the received video frames to other terminals participating in the video call, which, after receiving the video frames, may present the video corresponding to the video frames.

In embodiments of the present disclosure, a first template may be preset in the server. The first template may specify a layout of screen display. The first template may comprise a real-time video area for presenting images corresponding to video frames received by the server in real time. In an example, the real-time video area occupies the entire screen. In another example, the first template comprises a plurality of areas, wherein the real-time video area is the largest area.

After receiving video frames from the terminal(s), the server may transmit the received video frames to other terminals that are participating in the video call e.g., according to the first template. After receiving the video frames transmitted by the server, other terminals may present images corresponding to the video frames.

During the video call, when a user using a certain terminal desires to annotate the content conveyed by the video frames, he/she may send an annotation request to the server using the terminal. In step 201, the server receives the annotation request from the terminal.

It should be noted that a terminal sending an annotation request may be a terminal that is sending the video frames, or any of other terminals participating in the video call. The video frames sent by a terminal to the server may be video frames captured by the terminal through the video camera, or pre-stored video frames. The terminal may upstream a video stream composed by video frames to the server. The server may also transmit a video stream composed by video frames to other terminals.

In an embodiment, the server may receive annotation requests from multiple terminals. To this end, the server may be set up with an annotation queue. After receiving the annotation requests from different terminals, the server may add the annotation requests individually to the annotation queue.

The annotation queue may be a buffer queue. The server may add the received annotation requests to the annotation queue in order of reception time, and process the corresponding annotation requests in a Fist-in First-out order. In this way, the server may process multiple annotation requests, achieving simultaneous online annotating by multiple users.

In some embodiments, the annotation request may include an identifier of the terminal that sends the annotation request.

In step 202, the server may determine a frame of image that corresponds to the annotation request in the video call as an image to be annotated.

In an embodiment, the server may, on receiving the annotation request, lock a video frame that is currently received in real time, and then determine an image corresponding to the locked video frame as a frame of image that corresponds to the annotation request.

Alternatively, the frame of image that corresponds to the annotation request may also be determined in other manners. For example, the terminal may include, in the annotation request it sent, identification information of the video frame corresponding to the image to be annotated, e.g., a frame number. The server may extract the identification information from the annotation request, retrieve a corresponding video frame based on the identification information, and determine it as the frame of image that corresponds to the annotation request.

In step 203, the server may receive from the terminal an annotation message that corresponds to the annotation request.

The annotation message is used to characterize the annotation made by a user at the terminal. The annotation message may include one or more pieces of feature information of the annotation, e.g., shape of a graph used for the annotation, position of the annotation, content of the annotation, etc. Additionally, the annotation message may further include parameter information of the terminal relating to the annotation. In an embodiment, the annotation message may comprise screen resolution of screen of the terminal that sends the annotation message, and first position information. The screen resolution may be used to represent screen dimensions. The first position information may be used to indicate the position of the annotation in the screen of the terminal. In some embodiments, the first position information may be indicative of for example a position on the screen clicked with a mouse or touched with a finger and/or a stylus by the user when he/she annotates. The first position information may be represented with coordinates on the screen.

It should be noted that the annotation message may further comprise annotation color and/or annotation width. The annotation color may designate color for rendering the annotation, and the annotation width may designate width of a brush stroke for annotating.

In some embodiments, the annotation message may further comprise an identifier of the terminal that sends the annotation message.

In step 204, the server may generate an annotated image by annotating at a corresponding position in the image to be annotated based on the annotation message.

Upon receipt of the annotation message, the server may determine a position in the image to be annotated corresponding to the annotation message, and then generate the annotated image by annotating at the position. This may allow more accurate synchronization of information for annotation.

It should be noted that when multiple terminals annotate the same image to be annotated simultaneously, the server may receive annotation requests and annotation messages from the multiple terminals. In an embodiment, the server may add into the annotation queue the annotation messages received from the multiple terminals in association with their respective annotation requests using e.g., terminal identifiers in the annotation requests and annotation messages. The server may use individual threads to process the annotation requests in a temporal order, thereby achieving simultaneous online annotating by multiple users.

In an embodiment, the screen resolution of the terminal may be different from an image resolution of the image to be annotated. Hence, generation of the annotated image may further comprise the following sub-steps.

In sub-step S21, a conversion proportion between the screen resolution and the image resolution is calculated based on these two resolutions. In an example, conversion proportions in a horizontal direction and a vertical direction may be calculated respectively. In another example, the conversion proportion in either the horizontal direction or vertical direction may be calculated and used as the conversion proportion of the whole image.

In sub-step S22, the first position information is converted to second position information according to the conversion proportion. The second position information indicates a position in the image to be annotated.

In sub-step S23, the annotated image is generated by annotating at the position indicated by the second position information in the image to be annotated.

After the second position information is determined, the server may locate a position corresponding to the second position information in the image to be annotated, and then annotate at the position in order to generate the annotated image.

To illustrate the method according to the embodiment of the present disclosure more clearly, the method will be exemplarily described by way of an example. It should be appreciated that embodiments of the present disclosure are not limited thereto.

In this example, both terminal 1 and terminal 2 annotate an image to be annotated. Here, a screen resolution of screen of terminal 1 is exemplified as 640×480. User 1 of terminal 1 draws a point $P_1$ in the image to be annotated displayed on its screen, and the first position information on the screen corresponding to the point $P_1$ is $(x_1, y_1)$. A screen resolution of screen of terminal 2 is exemplified as 1280×960. User 2 of terminal 2 draws a point $P_2$ in the same image to be annotated displayed on its screen, and the first position information on the screen corresponding to the point $P_2$ is $(x_2, y_2)$. The image resolution of the image to be annotated is exemplified as 320×240. Upon receipt of annotation messages from terminal 1 and terminal 2, the server stores them in the annotation queue in order so that they will be processed in a sequential way.

The server first processes the annotation message from terminal 1 that is received first. The server obtains the screen resolution 640×480 of terminal 1 from the annotation message. Since the image resolution is 320×240, the conversion proportion of terminal 1 is calculated as ½.

Based on this conversion proportion, the server converts the first position information $(x_1, y_1)$ obtained from the annotation message to the second position information $(x_1/2, y_1/2)$.

The server annotates $P_1$ at a position corresponding to $(x_1/2, y_1/2)$ in the image to be annotated, to generate a first annotated image.

After processing the annotation message from terminal 1, the server may process the annotation message from terminal 2. Similarly, the server obtains the screen resolution (640×480) of terminal 2, and correspondingly calculates the conversion proportion of terminal 2 as ¼. Based on this conversion proportion, the server converts the first position information $(x_2, y_2)$ obtained from the annotation message to the second position information $(x_2/4, y_2/4)$. The server annotates $P_2$ at a position corresponding to $(x_1/2, y_1/2)$ in the first annotated image, to generate a second annotated image.

In step 205, the server transmits the second annotated image.

After the annotated image is generated, the server may send the annotated image to one or some or all of the terminals that are participating in the video call. In the case that multiple annotation messages are received, in some embodiments, the server may separately send every annotated images generated for respective annotation messages in order to consider each of annotation requests individually. This allows each of annotators to explain an intention of his annotation. In some other embodiments, the sever may alternatively send a finalized annotated image generated based on all annotation messages in order to take into account the annotations made by multiple users collectively. This allows users to comprehensively consider opinions from different parties.

In an embodiment, step 205 may comprise the following sub-steps.

In sub-step S31, a preset second template is employed to merge the annotated image and video frames received in real time into frames of target image. The second template may specify a layout of screen display. The second template may be used to present the annotated image.

Figure 3:
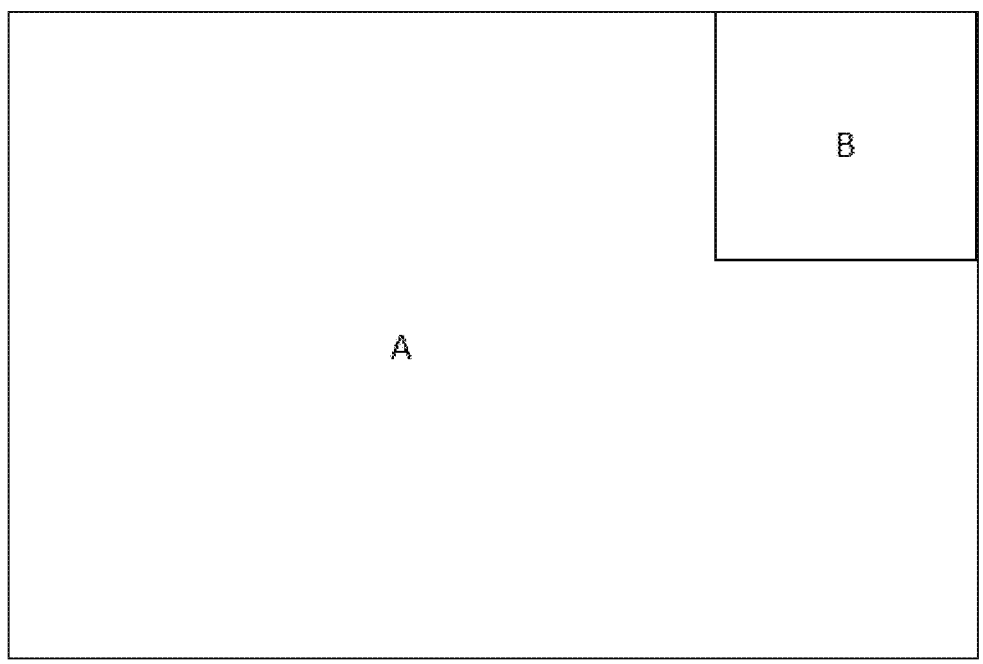
FIG. 3 is a schematic diagram of a template according to an embodiment of the present disclosure.

FIG. 3 illustrates an example of the second template. As shown in FIG. 3, the second template may include a real-time video area A and an annotated image area B. The real-time video area A may be used to present images corresponding to video frames received in real time, and the annotated image area B may be used to present an annotated image(s).

As an example, in the second template, to mainly present the annotated image, the annotated image area B may be larger than the real-time video area A. For example, the real-time video area may be set as having a specific position and size. For example, the real-time video area may be set as being located at a right upper corner of the screen, and sized to be a half or one-third of the annotated image area.

It should be noted that the first template and second template may also employ any other suitable screen layout. For example, the first and second templates may further include an annotating menu area for presenting options of annotating. The options may correspond to annotating commands such as "begin to annotate", "clear away annotation", etc. The user may issue an annotating command by clicking on a respective one of the annotating options. For example, "begin to annotate" may be selected to trigger sending of an annotation request, and "clear away annotation" may be selected to trigger sending of an annotation-clearing command. Additionally or alternatively, such options may also correspond to annotate settings, for example color of the annotation, width of the brush stroke for annotating, and the like.

After generating the annotated image, the server may arrange the annotated image and the video frames received in real time in corresponding demarcated areas according to a screen layout specified by the second template respectively, in order to merge them into frames of target image.

In embodiments of the present disclosure, the server combines the annotated image and video frames received in real time into frames of target image for transmission. Since it is not required to transmit the annotated image and the video frames received in real time separately, network bandwidth is saved and annotating efficiency is improved.

In an embodiment, the method of embodiments of the present disclosure may further include a step of stopping generation of the annotated image by the server when a preset stop condition is reached.

In some embodiments, the server may enter an annotating mode after receiving the annotation request. When the server detects in the annotating mode that the preset stop condition has been reached, the server may stop generation of the annotated image. The server may clear away the annotated image and make the annotated image transparent. Then, the server may return to use the first template to send the video frames received in real time, so that the terminal(s) only presents images corresponding to real-time video frames.

As an example, the preset stop condition may include but not limited to at least one of the following: receiving an annotation-clearing instruction from a terminal; and receiving no new annotation request within a preset time period after processing all of the annotation requests in the annotation queue.

Exemplarily, the annotation-clearing instruction may be an instruction sent by a terminal when the terminal detects change of video content of the real-time video frames. For example, the terminal may use a sensing device such as a gravity sensor and a gyro sensor to sense movement amplitude of the video camera that captures the video frames. In an example, when the sensing device senses that the movement amplitude of the video camera capturing the video frames is above a preset amplitude threshold, it is decided that change of the video content of the real-time video frames is detected. Additionally or alternatively, when a user initiatively clicks the "clear away annotation" option in the annotating menu, the terminal may also send the annotation-clearing instruction to the server.

In the method according to embodiments of the present disclosure, simultaneous annotating by many users may be achieved in a way that only annotation messages are required to be sent for annotating during a video call and then the annotated image is generated by the server. This ensures annotation messages to be shared accurately, thus improving the annotating efficiency.

Figure 4:
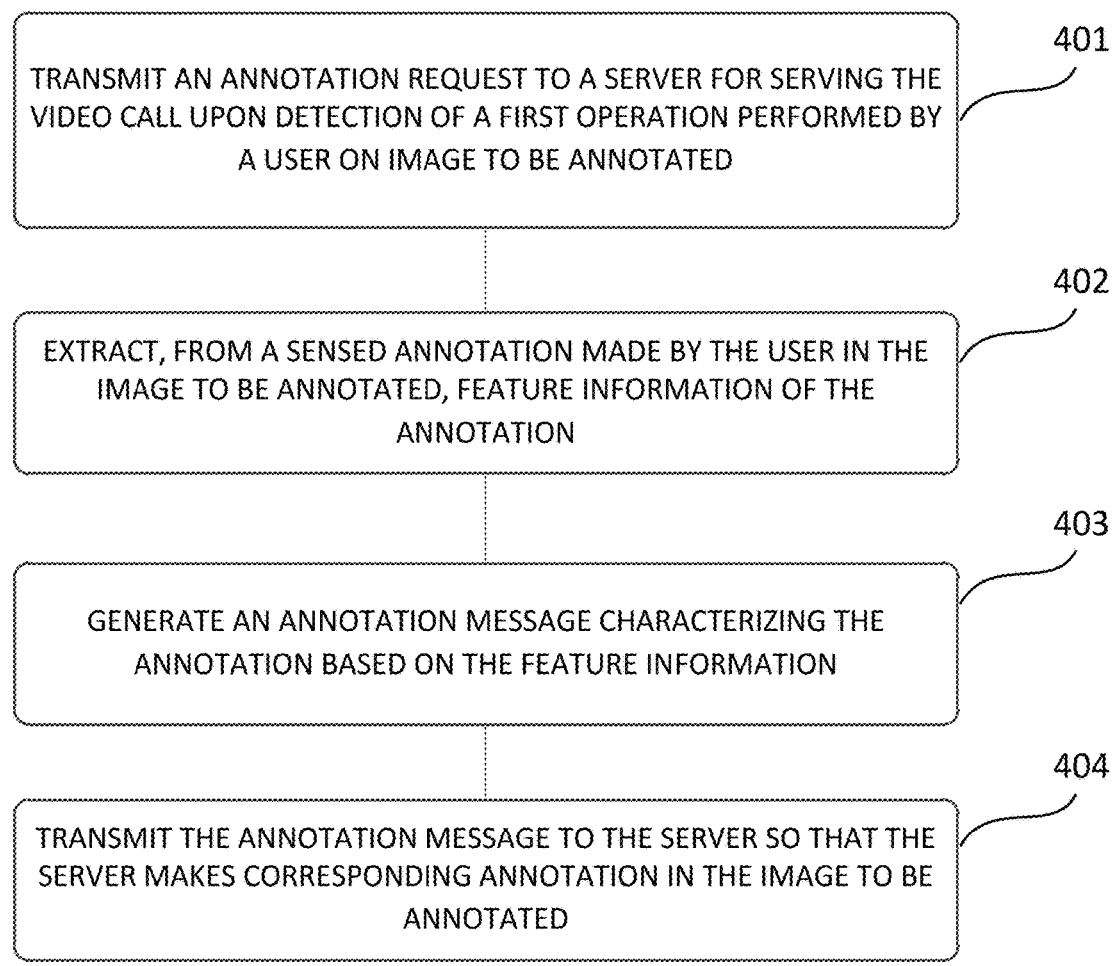
FIG. 4 is a flow chart of another exemplary method according to an embodiment of the present disclosure.

Referring to FIG. 4, it shows another exemplary method for sharing information during a video call according to an embodiment of the present disclosure. In this method, multiple terminals may establish a video call therebetween via a server. During the video call, when a user of one of the terminals desires to explain or discuss a certain problem, he/she may annotate video frames in the video call to facilitate explanation or discussion.

In step 401, during the video call, when the terminal detects the user's first operation on an image to be annotated, an annotation request may be sent to the server.

The user may use the image currently displayed on screen of the terminal as the image to be annotated. Alternatively, the user may return to a previously-displayed image, and use it as the image to be annotated. In some embodiments, the first operation may be a specific input from the user received through an input interface while the terminal displays images corresponding to the video frames, which may be, for example, triggering operations, such as using an pointer (e.g., a mouse) to click the image to be annotated, using a finger to touch the annotated image on the screen, pressing a specific key or key combination on a keyboard of the terminal, or swinging a sensor. The terminal may determine the user's intention of annotating the image upon detection of the user's such triggering operations on the presented image. Hence, the terminal generates an annotation request and transmits the annotation request to the server. In some embodiments, the annotation request may include identification information for identifying the image to be annotated, for example, a frame number of the video frame corresponding to the image, or time corresponding to the video frame in the video steam. This allows the server to more accurately position the image to be annotated in the video stream. Additionally, the annotation request may further include the identifier of the terminal.

In step 402, feature information of the annotation is extracted from the sensed annotation made by the user in the image to be annotated.

After sending the annotation request, the user may begin to annotate the image to be annotated, which is presented on the screen of the terminal. For example, in a scenario of remote maintenance, the image to be annotated may be a picture of a fault device. Hence, the user may use an input device, for example, a pointer or a stylus to draw a circle on a certain area of the image to be annotated to annotate the faulty point. The terminal may for example use a sensor to sense the annotating. After the terminal detects that the user's annotating operation is completed, it extracts relevant feature information from the annotation. For example, when the user uses a mouse to click or use a finger to touch the screen to annotate, the terminal may decide that the annotating operation is completed if the terminal detects a lifting event of the mouse or finger, or if the annotation formed by the user through these operations does not change within a certain time period. The feature information may include for example an area where the annotation is made and shape of a graph used for the annotation. In an embodiment, the feature information may further include color for the annotation or width of the brush stroke utilized for the annotation. In the case that the annotation involves an input text, the feature information may further include content of the annotation.

In step 403, an annotation message is generated based on the feature information for characterizing the annotation.

In some embodiments, after receiving the feature information, the terminal may use all or part of the feature information to generate the annotation message. In some other embodiments, the terminal may generate the annotation message based on the feature information and parameter information relating to the terminal. The parameter information may be resolution of the screen of the terminal, dimensions or aspect ratio of the screen, or the like.

Exemplarily, step 403 may include the following sub-steps.

In sub-step S41, the first position information included in the feature information is determined. The first position information indicates a position of the annotation made by the user in the displayed image to be annotated, namely, on the screen of the terminal. In sub-step S42, the resolution of the screen of the terminal is obtained. In sub-step S43, the screen resolution and the first position information are organized into the annotation message. The parameter information of the terminal may be added to the annotation message to enable the server to render the annotation more accurately.

In step 404, the annotation message is transmitted to the server so that the server can make corresponding annotation in the image to be annotated.

In some embodiments, when the user completes annotation-related discussion and explanation, the user might desire to switch to other video content for subsequent annotating, or even continue the play of the video stream without making any annotation. In this case, the method may further include the following steps.

When the terminal acting as a source of video frames detects that video content of the video frames it sent changes, it may generate an annotation-clearing instruction. For example, the terminal may use a sensing device such as a gravity sensor and a gyro sensor to sense movement amplitude of a video camera that is capturing the video frames. In an example, when the sensing device senses that the movement amplitude of the video camera that is capturing the video frames is above a preset amplitude threshold, it is decided that change of the video content of the real-time video frames is detected, and then the annotation-clearing instruction is generated based on this. Additionally or alternatively, in the case that the terminal transmits the stored video frames, when content of the transmitted video frames changes, the user may initiatively click for example the "clear away annotation" option on the annotating menu to send an annotation-clearing instruction to the server.

After receiving the annotation-clearing instruction, the server may stop generation of the annotated image, and may return to use the preset first template to transmit video frames received in real time.

In embodiments of the present disclosure, the annotating only requires sending an annotation message(s) during the video call so that the server may generate the annotated image(s), thereby achieving simultaneous annotating by many users, ensuring the accuracy of information sharing for annotation and improving the annotating efficiency.

In embodiments of the present disclosure, the terminal may receive the annotated image from the server and present the annotated image on the screen for the user. The user may use the annotated image to facilitate discussion or explanation with respect to a certain problem.

Various operations of embodiments are provided herein. It should be noted that the order of describing some or all of the operations should not be interpreted as implying that these operations are necessarily order dependent. Alternative ordering will be appreciated by those skilled in the art benefiting from this depiction. Further, it will be understood that not all operations are necessarily present in each embodiment provided herein.

It would be appreciated that the method of embodiments of the present disclosure may be performed in conjunction with any suitable hardware, software, firmware or combinations thereof. In at least some embodiments, the method may be executed by software in the form of computer readable instructions, embodied on some type of computer-readable storage medium, which may be performed under the influence of one or more processors.

Figure 5:
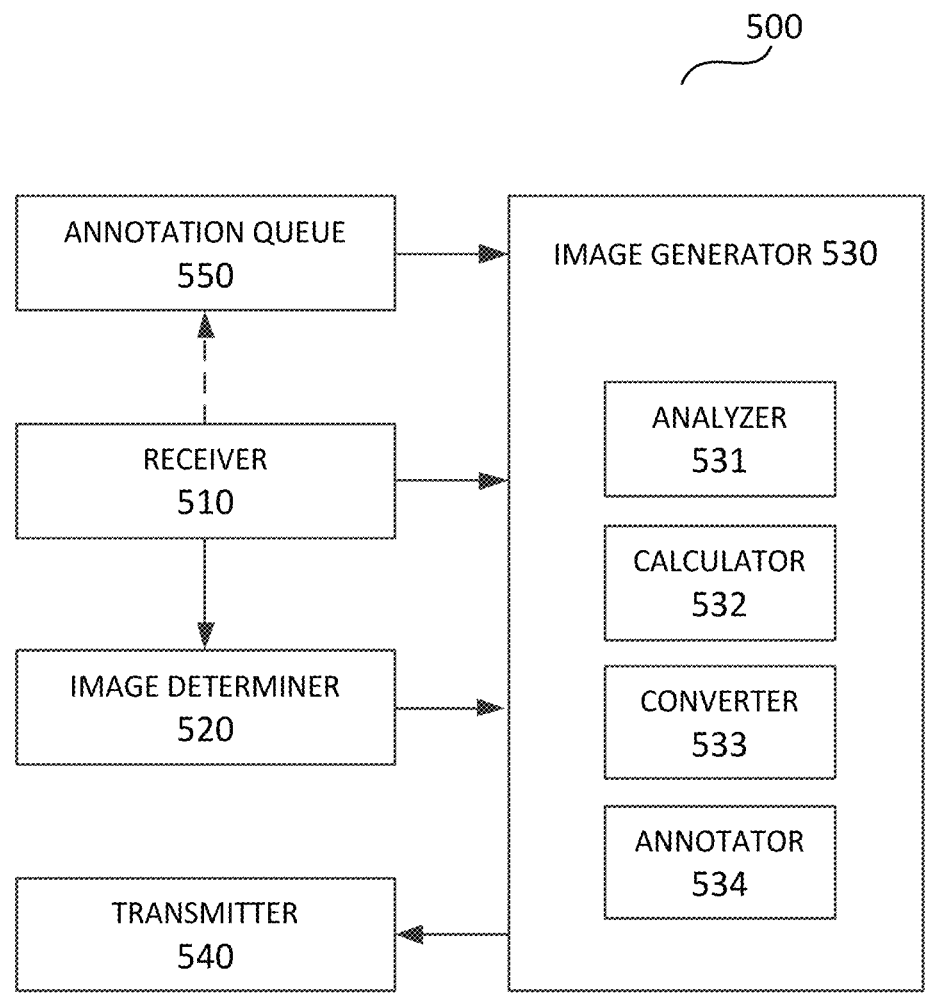
FIG. 5 is a block diagram of an exemplary apparatus according to an embodiment of the present disclosure.

Referring to FIG. 5, it shows a structural block diagram of an apparatus 500 for sharing information during a video call according to an embodiment of the present disclosure. The apparatus 500 may include a receiver 510, an image determiner 520, an image generator 530 and a transmitter 540.

The receiver 510 is configured to receive an annotation request from a terminal participating in the video call, and receive from the terminal an annotation message that corresponds to the annotation request.

The image determiner 520 is configured to determine a frame of image that corresponds to the annotation request in the video call as an image to be annotated.

The image generator 530 is configured to generating an annotated image by annotating at a corresponding position in the image to be annotated based on the annotation message.

The transmitter 540 is configured to transmit the annotated image.

In an embodiment, the annotation message comprises a screen resolution of screen of the terminal and first position information indicative of a position of the annotation on the screen of the terminal. The image generator 530 may comprise: an analyzer 531 configured to analyze the annotation message to obtain the screen resolution and the first position information; a calculator 532 configured to calculate a conversion proportion based on the screen resolution and image resolution of the image to be annotated; a converter 533 configured to convert the first position information to second position information indicative of a position in the image to be annotated according to the conversion proportion; and an annotator 534 configured to generate an annotated image by annotating at the position indicated by the second position information in the image to be annotated.

In an embodiment, the transmitter 540 is arranged to use a preset first template to transmit video frames received from the terminal in real time when no annotated image is generated.

In an embodiment, the apparatus 500 may further comprise an annotation queue 550. The receiver 510 may be arranged to, upon receipt of multiple annotation requests for the image to be annotated from multiple terminals, add these annotation request into the annotation queue 550 in order to process them in a sequential way. The apparatus 500 may allocate a corresponding storage space for the annotation queue 550.

In an embodiment, the transmitter 540 may be arranged to employ a preset second template to organize the annotated image and video frames received in real time into frames of target images, and transmit the target images.

In an embodiment, the image generator 530 is further arranged to stop generation of the annotated image when a preset stop condition is reached. At the time, the transmitter 540 returns to use the first template to transmit the video frames received in real time. In an embodiment, the first template includes a real-time video area, while the second template comprises a real-time video area and an annotated image area.

In an embodiment, the preset stop condition may include but not limited to at least one of the following: the receiver 510 receives an annotation-clearing instruction from the terminal; and the annotation queue 550 becomes an empty queue after all of the annotation requests are processed and no new annotation request is received within a preset time period.

In embodiments of the present disclosure, it is only required to send annotation messages for annotating during the video call, so that the annotated image may be generated by the server. As such, simultaneous annotating by multiple users is achieved, ensuring annotation information to be shared accurately and improving the annotating efficiency.

Figure 6:
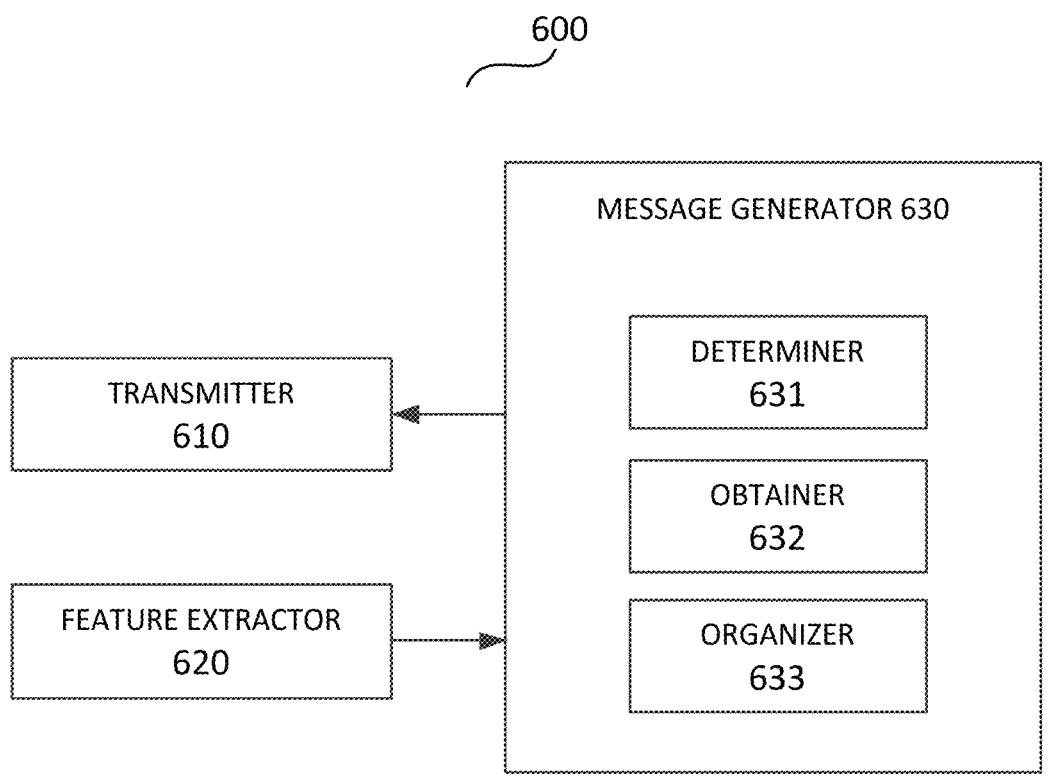
FIG. 6 is a block diagram of another exemplary apparatus according to an embodiment of the present disclosure.

Referring to FIG. 6, it shows a structural block diagram of an apparatus 600 for sharing information during a video call according to an embodiment of the present disclosure. The apparatus 600 includes a transmitter 610, a feature extractor 620 and a message generator 630.

The transmitter 610 is configured to transmit an annotation request to a server when a first operation performed by a user on an image to be annotated is detected during the video call.

The feature extractor 620 is configured to extract, from a sensed annotation made by the user in the image to be annotated, feature information of the annotation.

The message generator 630 is configured to generate an annotation message characterizing the annotation based on the feature information.

The transmitter 610 is further configured to transmit the annotation message to the server so that the server can make corresponding annotation in the image to be annotated.

In an embodiment, the generator 630 may comprise a determiner 631 configured to determine first position information that indicates a position in the displayed image to be annotated for the annotation made by the user as the feature information; an obtainer 632 configured to obtain a screen resolution of screen of the apparatus; and an organizer 633 configured to organize the screen resolution and the first position information into an annotation message.

In an embodiment, the apparatus 600 is further arranged to generate an annotation-clearing instruction when change of video content of real-time video frames is detected. The transmitter 610 is arranged to transmit the annotation-clearing instruction to the server so that the server stops generation of the annotated image.

The apparatus 600 further comprises a receiver (not shown) for receiving a video stream from the server, the annotated image and other relevant messages. For example, the receiver may receive a notification message from the server that indicates stop of annotating, and therefore stop transmission of information for annotating.

The apparatus 600 further comprises a display for displaying to the user the video frames and the annotated image received from the server.

It would be appreciated that although not totally shown, all possibilities discussed with respect to FIG. 2, FIG. 3 and FIG. 4 are also valid for FIG. 5 and FIG. 6.

Aspects of the present disclosure may be used individually, in combination or with various proper arrangements not detailed in the foregoing embodiments. Accordingly, application thereof is not limited to details and arrangements of components illustrated in the foregoing depiction or shown in the drawings. For example, some aspects described in one embodiment may be combined with some aspects described in other embodiments in any suitable manners.

Those skilled in the art should appreciate that embodiments of the present disclosure may be provided as a method, apparatus or computer program product. Hence, embodiments of the present disclosure may employ a form of complete hardware embodiments, complete software embodiments, or embodiments merging software and hardware aspects. Furthermore, embodiments of the present disclosure may employ a form of a computer program product implemented on one or more computer-useable storage media (including but not limited to magnetic disk memory, CD-ROM, and optical memory) with computer-useable program codes embodied therein.

Embodiments of the present disclosure are described herein with reference to flowcharts and/or block diagrams of methods, apparatus (systems), and computer program products according to embodiments of the present disclosure. It will be understood that each flow and/or block of the flowcharts and/or block diagrams, and combinations of flows and/or blocks in the flowcharts and/or block diagrams, can be implemented by computer program instructions.

These computer program instructions may be provided to a processor of a general purpose computer, special purpose computer, embedded processor or other programmable data processing end device to produce a machine, such that the instructions, when running on the computer or the processor of other programmable data processing end device, create means for performing the functions specified in one or more flows of flowcharts and/or one or more blocks of the block diagrams.

These computer program instructions may also be stored in a tangible computer readable storage device that can direct a computer or other programmable data processing end device to function in a particular manner, such that instructions stored in the computer readable storage device program a processor to produce an article of manufacture including instruction means, which perform functions specified in one or more flows of flowcharts and/or one or more blocks of the block diagrams.

These computer program instructions may also be loaded onto a memory of a computing device or other programmable data processing end devices such that the computer program instructions, when executed by a processor of the computing device or other programmable data processing end devices, perform steps of performing functions specified in one or more flows of flowcharts and/or one or more blocks of the block diagrams. It should be noted that herein, relational terms such as first and second and the like are only used to distinguish one entity or operation from another entity or operation without necessarily requiring or implying the presence of any such actual relationship or order between these entities or operations. Further, the term "comprising", "containing" or any other variation thereof are intended to cover a non-exclusive inclusion, such that a process, method, article, or end device including a series of elements not only includes those elements but also includes other elements not expressly listed, or further includes intrinsic elements of the process, method, article, or end device. Without more constraints, an element defined by the wording "comprising a . . . " does not exclude the case that the process, method, article, or end device including the element further include other identical elements.

In addition, although specific examples are employed herein to illustrate principles and implementation manners of the present disclosure, description of the above embodiments are only intended to facilitate comprehension of the ideas of the present disclosure. Those having ordinary skill in the art can envisage equivalent variations and modifications according to the ideas of the present disclosure. The present disclosure includes all such variations and modifications.

The invention claimed is:

1. A method for sharing information during a video call, the method comprising steps of:
   receiving an annotation request from a terminal participating in the video call;
   determining a frame of image that corresponds to the annotation request in the video call as an image to be annotated;
   receiving from the terminal an annotation message that corresponds to the annotation request;
   generating an annotated image by annotating at a corresponding position in the image to be annotated based on the annotation message; and
   transmitting the annotated image;
   wherein the annotation message comprises a screen resolution of a screen of the terminal and first position information indicative of a position of the annotation on the screen of the terminal, and the step of generating the annotated image comprises:
calculating a conversion proportion based on the screen resolution of the screen and an image resolution of the image to be annotated;
converting the first position information to second position information indicative of a position in the image to be annotated according to the conversion proportion; and
generating the annotated image by annotating at the position indicated by the second position information in the image to be annotated.

2. The method according to claim 1, wherein the step of receiving an annotation request from a terminal participating in the video call comprises:
adding the annotation request into a preset annotation queue upon receipt of the annotation request.

3. The method according to claim 1, further comprising: transmitting real-time video frames in the video call according to a first template when no annotated image is generated, and
after the annotated image is generated, the step of transmitting the annotated image comprises:
merging the annotated image and the real-time video frames into target images, and transmitting the target images according to a second template.

4. The method according to claim 2, further comprising: stopping generation of the annotated image when a preset stop condition is reached.

5. The method according to claim 4, wherein the preset stop condition comprises at least one of the following:
receiving an annotation-clearing instruction; and
receiving no new annotation request within a preset time period after all of the annotation requests in the annotation queue are processed.

6. The method according to claim 3, wherein the first template comprises a real-time video area, and the second template comprises a real-time video area and an annotated image area.

7. A method for sharing information during a video call, the method comprising:
transmitting an annotation request to a server for serving the video call when a first operation performed by a user on an image to be annotated is detected on a terminal participating in the video call;
extracting, from a sensed annotation made by the user in the image to be annotated, feature information of the annotation, the feature information comprising first position information indicative of a position of the annotation on a screen of the terminal;
generating an annotation message characterizing the annotation and comprising the first position information and a screen resolution of the screen based on the feature information and the screen resolution; and
transmitting the annotation message to the server to enable the server to make corresponding annotation at a corresponding position in the image to be annotated, the corresponding position being determined according to the first position information and the screen resolution.

8. The method according to claim 7, further comprising: generating an annotation-clearing instruction upon detection of change of video content of real-time video frames in the video call; and
transmitting the annotation-clearing instruction to the server to notify the server to stop annotation.

9. The method according to claim 7, further comprising: generating an annotation-clearing instruction upon detection of an annotation-clearing command issued by the user; and
transmitting the annotation-clearing instruction to the server to notify the server to stop annotation.

10. An apparatus for sharing information during a video call, the apparatus comprising:
a receiver configured to receive an annotation request from a terminal participating in the video call, and to receive an annotation message which corresponds to the annotation request;
an image determiner configured to determine a frame of image that corresponds to the annotation request in the video call as an image to be annotated;
an image generator configured to generate an annotated image by annotating at a corresponding position in the image to be annotated based on the annotation message;
a transmitter configured to transmit the annotated image;
an analyzer configured to analyze the annotation message to obtain a screen resolution of a screen of the terminal and first position information indicative of a position of the annotation on the screen of the terminal;
a calculator configured to calculate a conversion proportion based on the screen resolution and an image resolution of the image to be annotated;
a converter configured to convert the first position information to second position information indicative of a position in the image to be annotated according to the conversion proportion; and
an annotator configured to annotate at the position indicated by the second position information in the image to be annotated to generate the annotated image.

11. The apparatus according to claim 10, further comprising: an annotation queue, and the receiver is configured to, upon receipt of multiple annotation requests with respect to the image to be annotated, add the multiple annotation requests into the annotation queue in order so as to process them in a sequential way.

12. The apparatus according to claim 10, wherein the image generator is configured to stop generation of the annotated image when a preset stop condition is reached.

13. An apparatus for performing the method according to claim 7, the apparatus comprising:
a transmitter configured to transmit the annotation request to the server when the first operation performed by the user on the image to be annotated is detected during the video call;
a feature extractor configured to extract, from the sensed annotation made by the user in the image to be annotated, feature information of the annotation, the feature information comprising first position information indicative of a position of the annotation on a screen of the terminal; and
a message generator configured to generate the annotation message characterizing the annotation and comprising the first position information and a screen resolution of the screen based on the feature information and the screen resolution;
wherein the transmitter is further configured to transmit the annotation message to the server to enable the server to make corresponding annotation at a corresponding position in the image to be annotated, the corresponding position being determined according to the first position information and the screen resolution.

14. A non-transitory computer-readable medium having computer program instructions stored thereon, the computer program instructions being used to program a processor to execute the method according to claim 1.

15. A computing device comprising a processor and a memory with computer program instructions stored thereon, the computer program instructions, when executed by the processor, implementing the method according to claim 1.

16. A non-transitory computer-readable medium having computer program instructions stored thereon, the computer program instructions being used to program a processor to execute the method according to claim 7.

17. A computing device comprising a processor and a memory with computer program instructions stored thereon, the computer program instructions, when executed by the processor, implementing the method according to claim 7.

* * * * *